United States Patent

Nishio et al.

[11] Patent Number: 6,073,653
[45] Date of Patent: Jun. 13, 2000

[54] CONTROL DEVICE

[75] Inventors: Shigenori Nishio, Osaka; Hiroshi Kimura, Nara; Masao Kawakami, Osaka, all of Japan

[73] Assignee: Suminoe Textile Co., Ltd., Osaka, Japan

[21] Appl. No.: 09/208,986

[22] Filed: Dec. 11, 1998

[30] Foreign Application Priority Data

Jun. 3, 1998 [JP] Japan .................................. 10-154787

[51] Int. Cl.[7] ...................................................... F17D 3/18
[52] U.S. Cl. ............................................ 137/599; 137/486
[58] Field of Search ............................... 137/487.5, 488, 137/486, 599; 417/504

[56] References Cited

U.S. PATENT DOCUMENTS

| H1326 | 7/1994 | Lefebure | 137/486 |
|---|---|---|---|
| 3,292,500 | 12/1966 | Risk | 137/486 |
| 3,543,784 | 12/1970 | Smith | 137/487 |
| 3,633,597 | 1/1972 | Jobe | 137/487.5 |
| 4,508,127 | 4/1985 | Thurston . | |
| 4,718,443 | 1/1988 | Adney | 137/486 |
| 4,735,225 | 4/1988 | Huveteau . | |
| 4,953,618 | 9/1990 | Hamid et al. . | |
| 5,190,068 | 3/1993 | Philbin | 137/487.5 |

FOREIGN PATENT DOCUMENTS 0 554 725  8/1993  European Pat. Off. .

*Primary Examiner*—Denise L. Ferensic
*Assistant Examiner*—K B. Rinehart
*Attorney, Agent, or Firm*—Wenderoth, Lind & Ponack, L.L.P.

[57] ABSTRACT

A flow control device can variably control the flow rate with extremely high accuracy over a wide flow rate range from a high to a low flow rate with a single pump. In this flow control device, a pump is provided in a main pipe line through which fluid is fed. A bypass branches from the main pipe line at a point nearer to the discharge port than is the pump. A flowmeter and a flow control valve are provided in the bypass. In the bypass is further provided a back pressure regulating valve near the discharge port. The degree of opening of the flow control valve is adjusted based on the flow rate detected by the flowmeter. The back pressure regulating valve suppresses pressure fluctuation on the discharge side of the flow control valve.

7 Claims, 6 Drawing Sheets

☒ : controllable flow rate range of flow control valve

▨ : discharge flow rate range of pump

CONTROL DEVICE

BACKGROUND OF THE INVENTION

This invention relates to a flow control device which can control the flow rate of fluid over a wide flow rate range.

Most popular conventional means for feeding fluid through pipes while controlling its flow rate are pumps.

But pumps have a narrow controllable flow rate range. Even gear pumps, which have the widest controllable flow rate range, have a discharge ratio (ratio of the minimum controllable flow rate to the maximum controllable flow rate) of only about 1:10. In fields or applications where the flow rate has to be controlled with higher accuracy over a wider range, pumps are useless.

On the other hand, in the field where textile products are dyed, to cope with a large variety of designs, it is necessary to feed dye solutions that differ widely in concentration from one another into tanks while adjusting the flow rates of the dye solutions with high accuracy. This was usually done by a batch process in which different kinds of powder dyes were weighed out, mixed together and melted to adjust the concentration of each dye solution, and filled in each tank. But in the batch process, the greater the number of kinds of dyes of different concentrations, the more time-consuming it was to prepare dye solutions. It was therefore desired to shorten the time for preparing dye solutions.

It is therefore required to develop an automatic system for preparing dye solutions which can prepare a plurality of kinds of dye solutions having vastly different concentrations from each other with high accuracy and to feed them. Since the discharge ratio controllable by a single pump is 1:10 at the most, one way to construct a system which can cope with such a wide concentration range is to use a plurality of such pumps each for one of a plurality of concentration regions from high to low. Unexamined Japanese patent publication 63-35873 discloses such a structure. But this arrangement needs as many pumps as the number of dye concentration regions, so that the facility and installation costs increase. Thus, such a system is not suitable for industrial production. Desired is a device which can control the flow rate of fluid with high accuracy over a wide flow rate range with a single pump.

An object of this invention is to provide a flow control device which can control the flow rate with extremely high accuracy over a wide flow rate range with a single pump.

SUMMARY OF THE INVENTION

According to the present invention, there is provided a flow control device comprising: a main pipe line having an inlet port through which fluid is introduced into the main pipe line, and a discharge port; a pump provided in the main pipe line and having a predetermined discharge flow rate range; a flowmeter provided in the main pipe line between the pump and the discharge port; and a flow control valve provided in the main pipe line between the pump and the discharge port; the flow control valve having a control flow rate range including a flow rate range lower than the predetermined discharge flow rate range of the pump; whereby the degree of opening of the flow control valve is adjusted based on flow rate data from the flowmeter.

According to the present invention, there is also provided a flow control device comprising a main pipe line having an inlet port through which fluid is introduced into the main pipe line, and a discharge port; a bypass pipe line branching from the main pipe line at a first point and merging with the main pipe line at a second point disposed between the first point and the discharge port; a pump provided in the main pipe line between the inlet port and the first point and having a predetermined discharge flow rate range; a changeover valve provided in the main pipe line at the first point; a first flowmeter provided in the main pipe line between the pump and the discharge port; a second flowmeter and a flow control valve provided in the bypass line; the flow control valve having a control flow rate range including a flow rate range lower than the predetermined discharge flow rate range of the pump; and a flow control unit for operating the changeover valve to feed fluid into the bypass line and adjusting the degree of opening of the flow control valve based on flow rate data from the second flowmeter if the fluid is to be fed at a flow rate lower than a predetermined value; and for operating the changeover valve to feed fluid through the main pipe line and adjusting the degree of opening of the pump based on flow rate data from the first flowmeter if the fluid is to be fed at a flow rate higher than the predetermined value.

Other features and objects of the present invention will become apparent from the following description made with reference to the accompanying drawings, in which:

DETAILED DESCRIPTION OF THE PREFERRED EMBODIMENT

Figure 1:
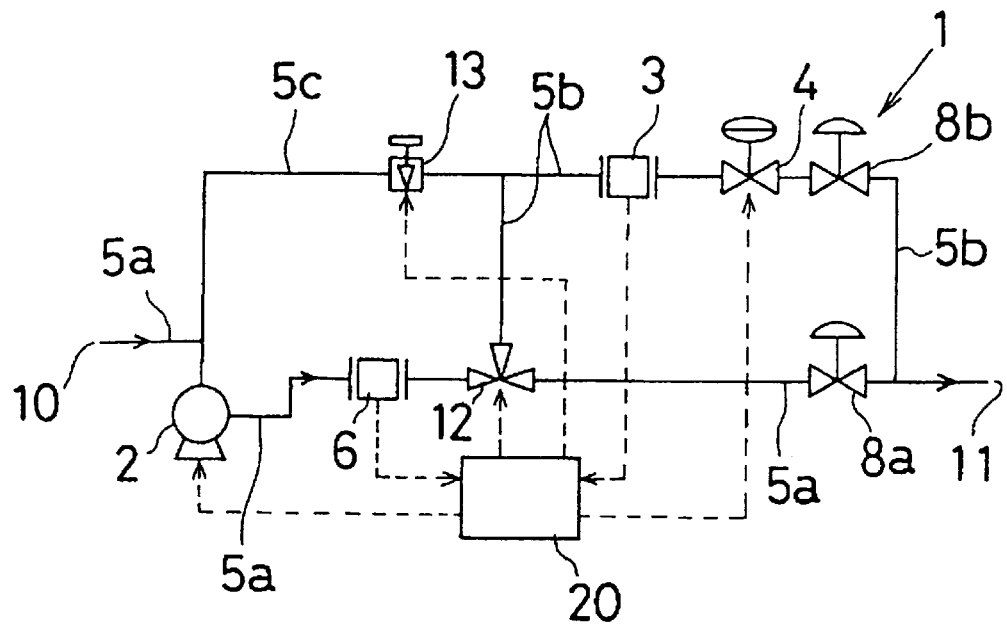
FIG. 1 is a schematic diagram showing the structure of a flow control device embodying this invention.
Figure 2A:
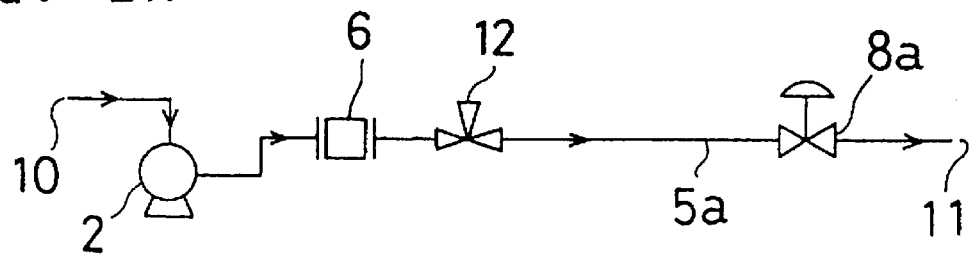
FIGS. 2A and 2B explain flow paths of fluid, with FIG. 2A showing a flow path when fluid is fed at a high rate, and FIG. 2B showing a flow path when fluid is fed at a low rate.
Figure 2B:
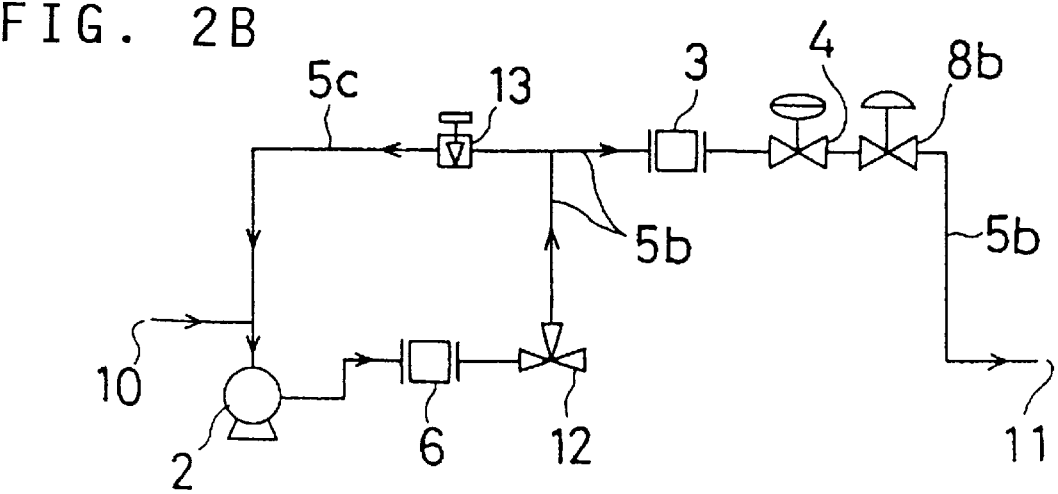

Referring to FIGS. 1, 2A and 2B, the device shown includes a pump 2, a bypass flowmeter 3, a flow control valve 4, pipe lines 5, a main pipe back pressure regulating valve 8a, and a bypass back pressure regulating valve 8b. The pipe lines 5 comprise a main line 5a, a bypass 5b and a return line 5c.

The main line 5a has an inlet port 10 at one end through which fluid enters, and a discharge port 11 at the other end. The pump 2 is provided near the inlet 10 of the main line 5a. A variable-volume pump is preferable because it is high in discharge ratio and accurate. A gear pump is the most preferable.

The device 1 further includes a main line flowmeter 6 between the pump 2 and the discharge port 11. The flowmeter 6 is preferably an electromagnetic flowmeter because such flowmeter is high in range ability and accurate. The flow rate detected by the flowmeter 6 is inputted into a controller 20 which, based on the detected value, adjusts the discharge rate from the pump 2. The main line flowmeter 6 is not an essential element but a desirable option for higher accuracy of flow control.

The bypass 5b branches from the main line 5 at a point between the main line flowmeter 6 and the discharge port 11. At the branch point, a changeover valve 12 is provided. The bypass 5b merges with the main line 5a at a point immediately upstream of the discharge port 11. The controller 20 controls the changeover valve 12 to selectively direct fluid introduced into the main line 5a through the pump 2, into the bypass 5b or through the main line 5a.

The bypass flowmeter 3 and the flow control valve 4 are provided in the bypass 5b. The bypass back pressure regulating valve 8b is also provided in the bypass at a point near the discharge port 11.

As the bypass flowmeter 3 an electromagnetic flowmeter is preferable because such flowmeter is high in range ability and accurate. The flow rate detected by this flowmeter 3 is entered into the controller 20, which, based on the detected value, adjusts the degree of opening of the flow control valve 4.

Figure 5A:
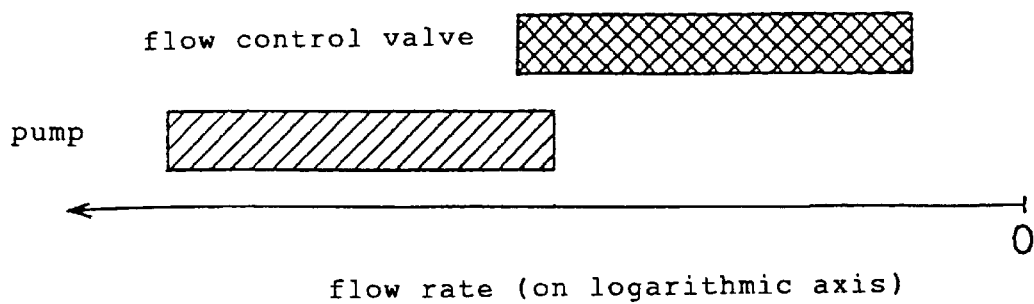
FIG. 5 shows the relation between the discharge flow rate range of a pump and the controlled flow rate range of a control valve.
Figure 5B:
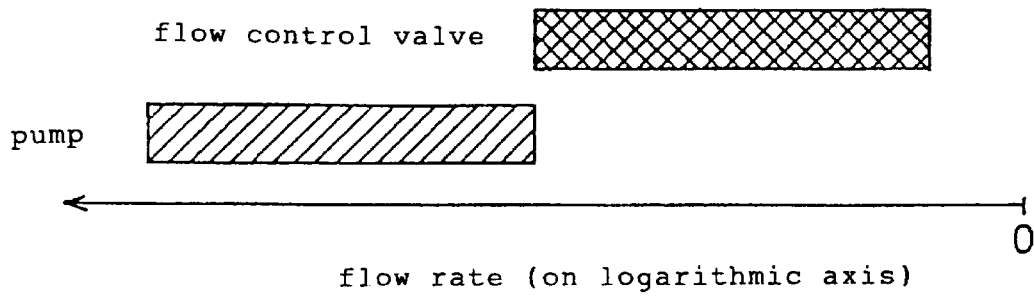

The flow control valve 4 should be such that can control the flow rate within the range that is lower than the discharge flow rate range controllable by the pump 2. Specifically, the flow control ranges of the pump 2 and the valve 4 should be determined such that the flow control ranges by the valve 4 and the pump 2 overlap with each other, as shown in FIG. 5A, or the upper limit of the flow range controllable by the valve 4 substantially coincides with the lower limit of the flow range controllable by the pump 2 as shown in FIG. 5B. In either arrangement, there exists no region where it is impossible to control the flow rate between the flow range controllable by the pump 2 and the one controllable by the flow control valve 4, so that it is possible to accurately control the flow rate over a wide flow rate range from high to low flow rate. Of course, the flow ranges controllable by the pump 2 and the valve 4 may overlap with each other over a wider area than the area shown in FIG. 5A. But the wider the overlap, the narrower the range within which the flow rate is controllable with high accuracy.

The bypass back pressure regulating valve 8b may be any valve which can suppress pressure fluctuation at the discharge end of the flow control valve 4. For example, it may be a back pressure regulating valve (BV-F10SE made by Tacmina, pressure regulating range 0.5–2.5 kgf/cm$^2$), an upstream pressure regulating valve (GD-20R made by Yoshitake, pressure regulating range 0.5–2.5 kgf/cm$^2$), or a back pressure regulating valve (RPD 52-2 made by Fushiman, pressure regulating range 0.7–2.0 kgf/cm$^2$). By providing the back pressure regulating valve 8b on the discharge side of the flow control valve 4, it is possible to suppress pressure fluctuation on the discharge side of the flow control valve 4. The flow control valve 4 can thus produce a constant differential pressure, making accurate flow control possible.

The return line 5c connects a point of the bypass 5b nearer to the inlet 10 than is the flowmeter 3 with a point of the main line 5a nearer to the inlet 10 than is the pump 2. Any excess fluid resulting from flow control by the flow control valve 4 while fluid is being fed through the bypass 5b is directed into the return line 5c and merged into fluid being fed from the inlet 10 at a point nearer to the inlet 10 than is the pump 2. Excess fluid is returned into the main line 5a. This prevents waste of fluid.

The controller 20 selectively opens and closes the return line 5c by controlling a needle valve 13. In order to feed fluid only through the main line 5a, the controller 20 closes the needle valve 13 to prevent fluid in the main line 5a from flowing into the return line 5c.

The flow control device 1 is used to control the flow rate in the following manner. First, a desired flow rate or a flow rate setting program is entered into the controller 20. The controller 20 determines if the desired flow rate entered is within a high flow rate range controllable by the pump 2 only or within a low flow rate range controllable by the cooperation of the pump 2 and the flow control valve 4. In the former case, the controller 20 controls the changeover valve 12 to feed fluid through the main line 5a. In the latter case, the controller controls the changeover valve 12 to direct fluid into the bypass line 5b.

FIG. 2A shows the flow path when fluid is fed at a high rate. As mentioned earlier, the controller 20 controls the changeover valve 12 to open the main line 5a and closes the needle valve 13 in the return line 5c. Fluid sucked in through the inlet 10 by the pump 2 flows through the main line 5a and is discharged through the discharge port 11. At this time, the flow rate of the fluid fed by the pump 2 is continuously monitored by the main line flowmeter 6. If the monitored flow rate is out of a predetermined range, the controller 20 produces a signal to adjust the degree of opening of the pump 2. Fluid can thus be fed at a higher rate with high accuracy. Since the main line back pressure regulating valve 8a provided near the discharge port 11 suppresses pressure fluctuation on the discharge side of the main line 5a, the flow rate can be controlled even more accurately.

On the other hand, FIG. 2B shows a flow path when fluid is to be fed at a low rate. The controller 20 controls the changeover valve 12 to direct fluid into the bypass 5b and fully opens the needle valve 13 in the return line 5c. The controller 20 further controls the degree of opening of the pump 2 so that fluid flows at a minimum or a low rate within an accurately controllable range. It also controls the flow control valve 4 so that fluid will be discharged at a predetermined flow rate. Thus, fluid sucked in through the inlet port 10 by the pump 2 flows through the main line 5a, and is directed by the changeover valve 12 into the bypass 5b as shown in FIG. 2B. In the bypass 5b, fluid passes through the flow control valve 4, where its flow rate is controlled, and a bypass back pressure regulating valve 8b and is discharged through the discharge port 11.

The flow rate of the fluid flowing through the bypass 5b is continuously monitored by the bypass flowmeter 3. If the monitored flow rate is out of a predetermined flow rate range, the controller 20 produces a signal to control the degree of opening of the flow control valve 4. Fluid can thus be fed at a low rate with high accuracy. Since the bypass back pressure regulating valve 8b, provided nearer to the outlet port 11 than are the bypass flowmeter 3 and the flow control valve 4, suppresses pressure fluctuation on the discharge side of the flow control valve 4, fluid flow can be controlled with even higher accuracy. In the embodiment, the bypass back pressure regulating valve 8b is provided in the bypass 5b; that is, no pipe branches from the portion of the line between the flow control valve 4 and the bypass back pressure regulating valve 8b. Thus, it is possible to more reliably avoid any influence of pressure fluctuation. This makes it possible to more accurately control the flow rate.

Any excess fluid resulting from throttling of the flow control valve 4 flows through the return line 5c and merges into fluid supplied from the inlet 10 at a point nearer to the inlet 10 than is the pump 2. The return line 5c thus serves to return any excess fluid into the main line 5a, avoiding waste.

Figure 7:
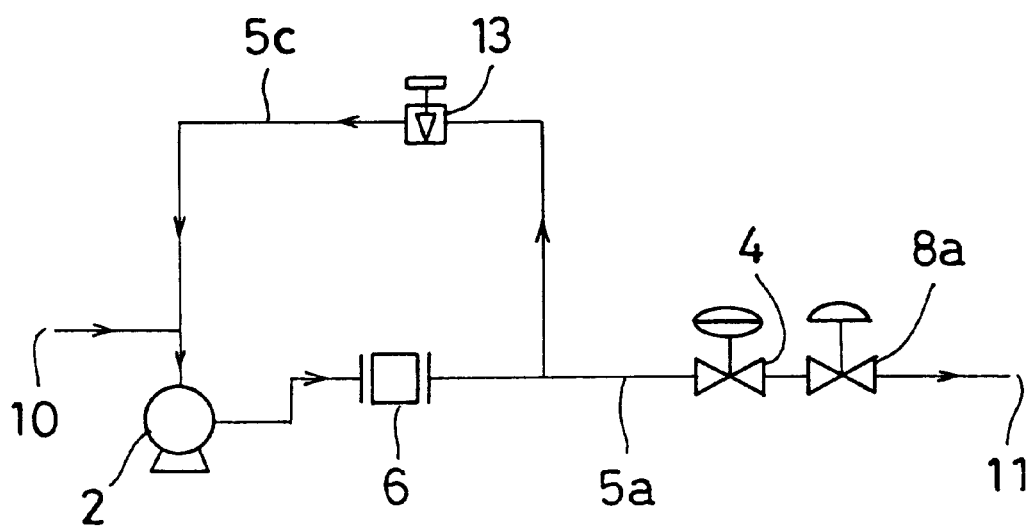
FIG. 7 is a schematic diagram of still another embodiment.

Referring to FIG. 7, another embodiment is shown in which no bypass line is provided. In the main pipe line 5a, a flowmeter 6, a flow control valve 4 and a back pressure regulating valve 8a are provided. Also, a return line 5c is provided to connect a point between the flowmeter 6 and the flow control valve 4 with a portion of the main line between the inlet port and the pump.

With this embodiment, when fluid is to be fed at a high rate, fluid is fed through the pump 2 with only the opening of the pump adjusted and with the flow control valve 4 fully open. When fluid is to be fed at a low rate, the opening of the flow control valve 4, too, is adjusted in response to the signal from the flowmeter 6.

In the flow control device according to this invention, when fluid is fed at a high rate, fluid is fed only through the main pump 5a and only the degree of opening of the pump 2 is adjusted. Thus, it is possible to feed fluid at a high rate while controlling the flow rate with high accuracy within the discharge flow rate range controllable by the pump 2. The main line back pressure regulating valve 8a further improves the accuracy of flow rate control.

On the other hand, when fluid is to be fed at a low rate, fluid fed at a low rate by the pump 2 is directed into the bypass 5b, where its flow rate is controlled by adjusting the degree of opening of the flow control valve 4. Thus, it is possible to feed fluid at a rate far lower than the lower limit of the discharge flow rate range controllable by the pump 2. The bypass back pressure regulating valve 8b provided in the bypass 5b on the discharge side of the flow control valve 4 further improves the accuracy of flow control.

According to this invention, using a single pump, it is possible to feed fluid at a high rate which is equal to the upper limit of the discharge flow rate range controllable by the pump and at a low rate which is equal to the lower limit of the flow rate range controllable by the flow control valve with extremely high accuracy. Since no plurality of pumps are needed, it is possible to reduce the cost and the installation space.

In the embodiment, each line 5a, 5b has a back pressure regulating valve 8a, 8b. But a different arrangement may be used. For example, a back pressure regulating valve may be provided only in the main line 5a. Also, it may be provided only on the discharge side of the bypass 5b. But the arrangement of the present embodiment is most desirable for more accurate flow rate control over a wide flow rate range from a low to a high flow rate.

Since the flow control device can control flow rate with extremely high accuracy over a wide flow rate range from a high to a low flow rate, it can be used advantageously for the adjustment of dye solutions for dyeing textile products.

Figure 3:
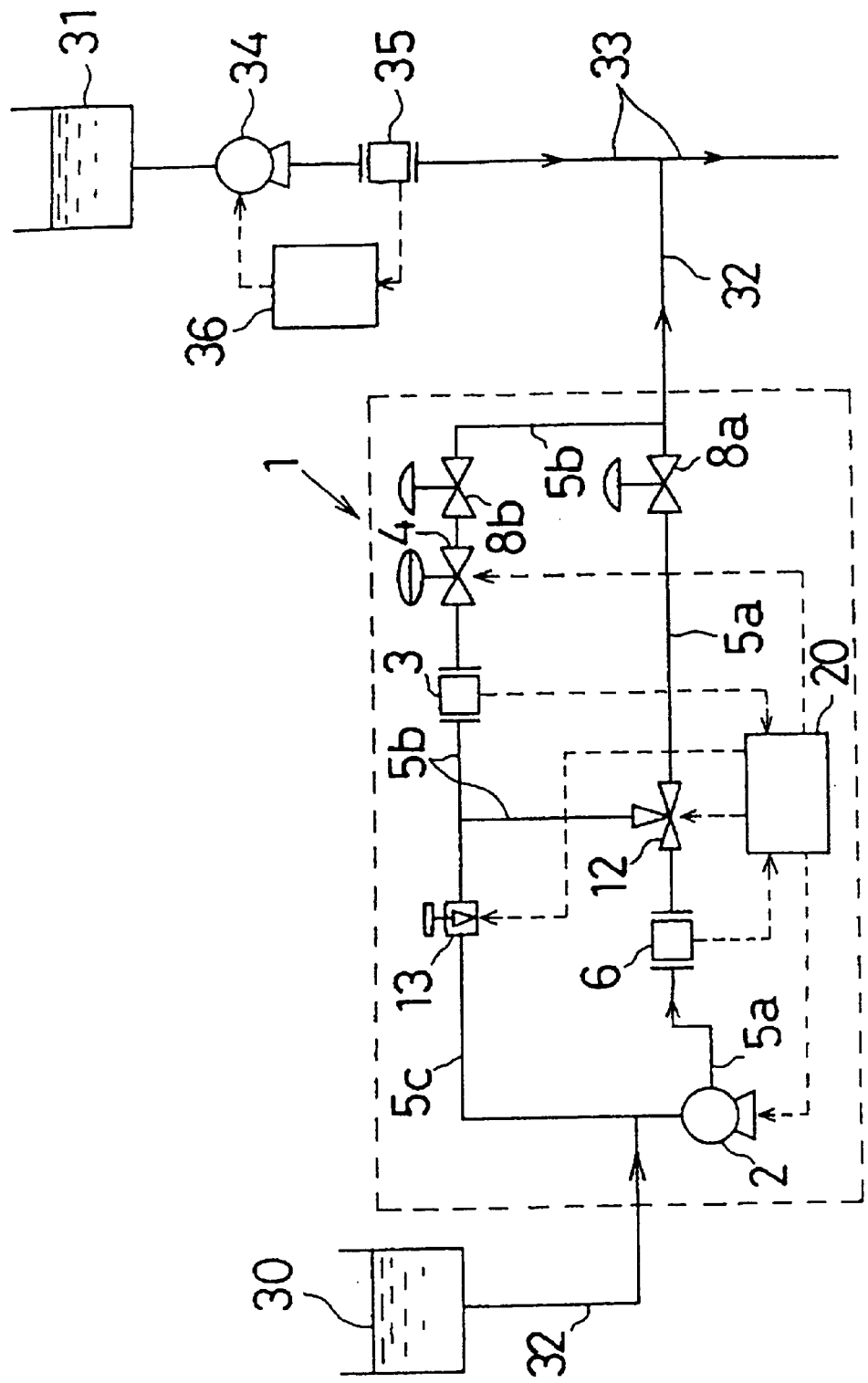
FIG. 3 is a schematic diagram showing the structure of an automatic system for preparing solutions.

Dye solutions that widely differ in concentration have to be fed into tanks after adjusting their flow rates with high accuracy to cope with a variety of designs. By providing the flow control device of this invention in a dye supply pipe line 32 of a solution adjusting system as shown in FIG. 3, it is possible to discharge dye concentrate 30 through the dye supply pipe line 32 into a main supply pipe 33 through which water is being fed at a constant rate, while controlling the flow rate with high accuracy over a wide flow rate range. As a result, it is possible to prepare dye solutions that differ widely in concentration while accurately controlling the concentration. A pump 34 cooperates with a flowmeter 35 and a controller 36 to feed water at a constant rate.

Figure 4:
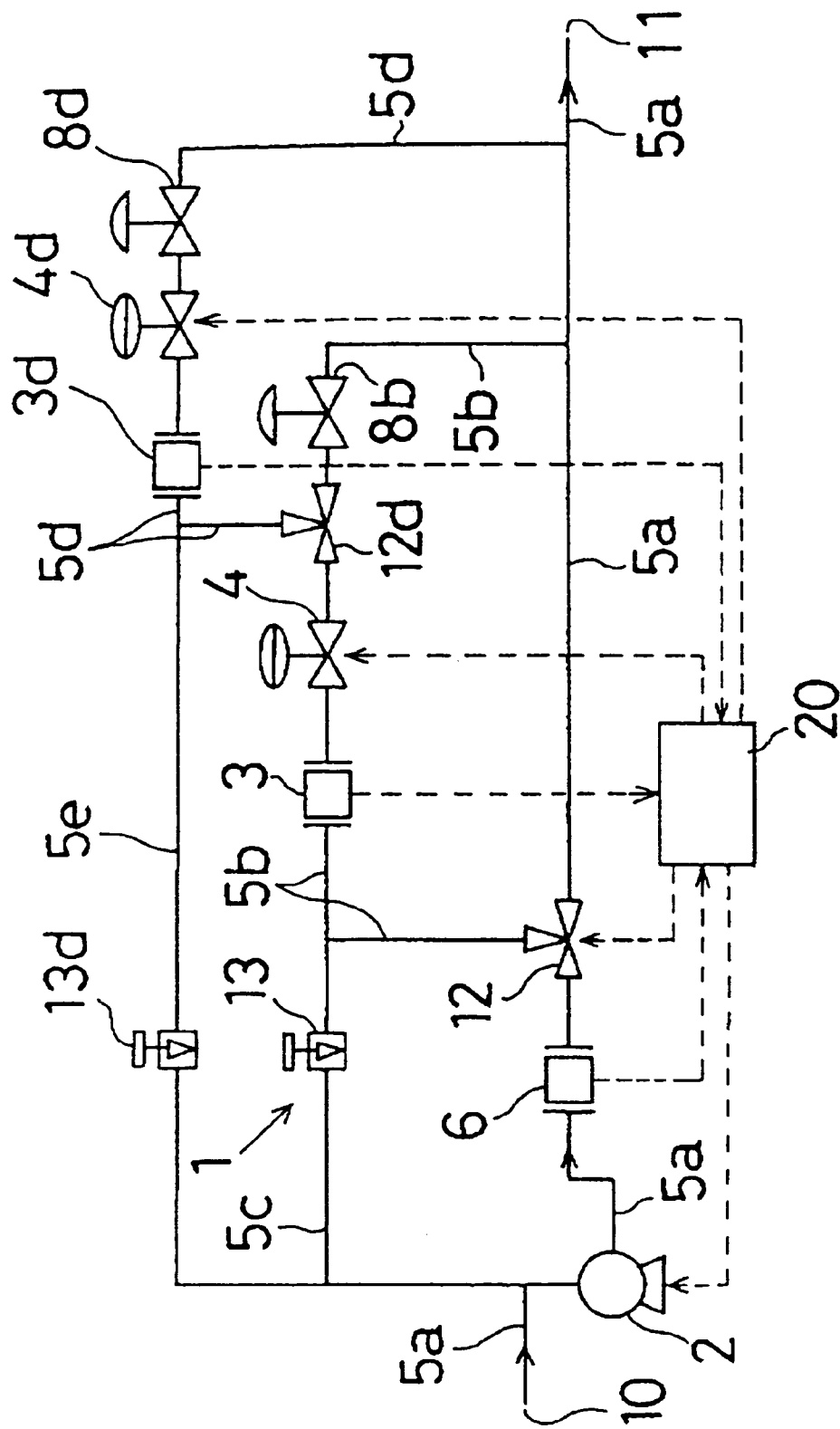
FIG. 4 is a schematic diagram showing the structure of another flow control device embodying the invention.

The flow control device of this invention may include a second bypass 5d besides the bypass 5b. As shown in FIG. 4, a second bypass 5d branches through a second changeover valve 12d from the bypass 5b at a point between the flow control valve 4 and the bypass back pressure regulating valve 8b. The second bypass 5d has a second bypass flowmeter 3d, a second bypass flow control valve 4d, and a second bypass back pressure regulating valve 8d, and merging with the main line 5a immediately before the outlet 11. A second return line 5e having a second needle valve 13d is provided.

Since the bypass lines are provided in two stages, it is possible to further reduce the flow rate with the second bypass flow control valve 4d by feeding the fluid whose flow rate has been controlled to a low level in the bypass 5b into the second bypass 5d. The device can control the flow rate with high accuracy over a wider flow rate range than the device in which the bypass is provided in one stage. Further, since each line 5a, 5b, 5d has a back pressure regulating valve 8a, 8b, 8d, flow control accuracy further improves for fluid flow control in any line.

Of course, a third bypass may be provided for the second bypass. With this arrangement, it is possible to control the flow rate with accuracy over a wider flow rate range.

Example 1

The flow control device of FIG. 1 was used to control the flow rate of a dye concentrate. With the inlet of the main line of the flow control device connected to the bottom of a dye concentrate tank in which was stored a dye concentrate, the flow control device was activated with the flow rate set at the values shown in Table 1. For the actual flow rate when the dye concentrate was fed for an hour, when the flow rate was high (2–20 L/min), the flow rate output from the main line flowmeter was monitored by a personal computer through an A/D converter. When the flow rate was low (0.2–2 L/min), the flow rate output from the bypass flowmeter was monitored, processed and recorded by the personal computer through an A/D converter. Based on them, the maximum flow rate fluctuation rate ((actual flow rate−predetermined flow rate)÷predetermined flow rate×100) was determined. The results are shown in Table 1.

A gear pump (controllable flow rate: 2–20 L/min) was used as the pump of the flow control device. A regulating valve (type HLS ACT. HAIR made by YAMATAKE Honeywell, single-acting HEP electro-pneumatic valve positioner: type HEP15–114, controllable flow rate range: 0.2–2 L/min) was used as the flow control valve. As the bypass back pressure regulating valve, a back pressure valve (type: BV-F10SE made by Tacmina, pressure regulating range: 0.5–2.5 kgf/cm$^2$) was used. As the main line back pressure regulating valve, a back pressure valve (type: BV-F25SE made by Tacmina, pressure regulating range: 0.5–2.5 kgf/cm$^2$) was used. As the bypass flowmeter, an electromagnetic flowmeter (detectable flow rate range: 0.2–2 L/min) was used. As the main line flowmeter, an electromagnetic flowmeter (detectable flow rate range: 2–20 L/min) was used.

When fluid was fed at a high rate (2–20 L/min), only the main line was used as a flow path by changing over the changeover valve. On the other hand, when fluid was fed at a low rate (0.2–2 L/min), the flow path from the main line to the bypass was used as a flow path by changing over the changeover valve. In either case, the degree of opening of the gear pump was set so that the flow rate would be 2 L/min.

Comparative Example 1

Figure 6A:
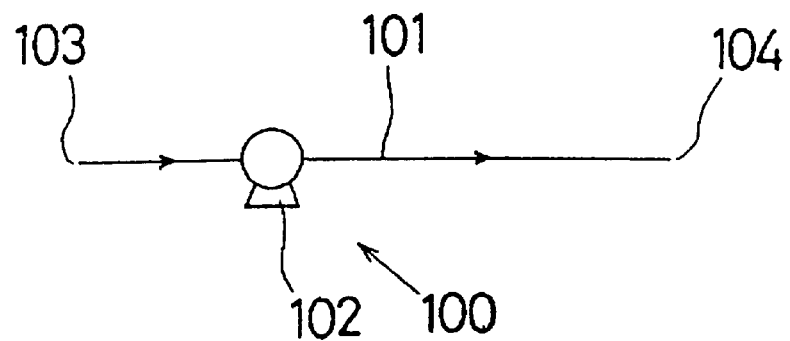
FIGS. 6A and 6B are a schematic diagrams showing the structure of flow control devices of comparative examples, with FIG. 6A showing the structure of a flow control device of Comparative Example 1 and FIG. 6B showing the structure of a flow control device of Comparative Example 2.

A flow control device 100 shown in FIG. 6A and comprising a single pipe line 101 and a pump 102 provided in the line 101 was used to control the flow rate of a dye concentrate. With the inlet 103 of the pipe line of the flow control device 100 connected to the bottom of a dye concentrate tank in which is stored a dye concentrate, the flow control device was activated with the flow rate set at the values shown in Table 2. The actual flow rate when the dye concentrate was fed for an hour was monitored, processed and recorded by a personal computer using a flowmeter provided at the outlet 104 of the pipe in the same manner as in Example 1. Based on them, the maximum value of the actual flow rate fluctuation rate was determined. The results are shown in Table 2. The pump was the same gear pump as used in Example 1.

Comparative Example 2

Figure 6B:
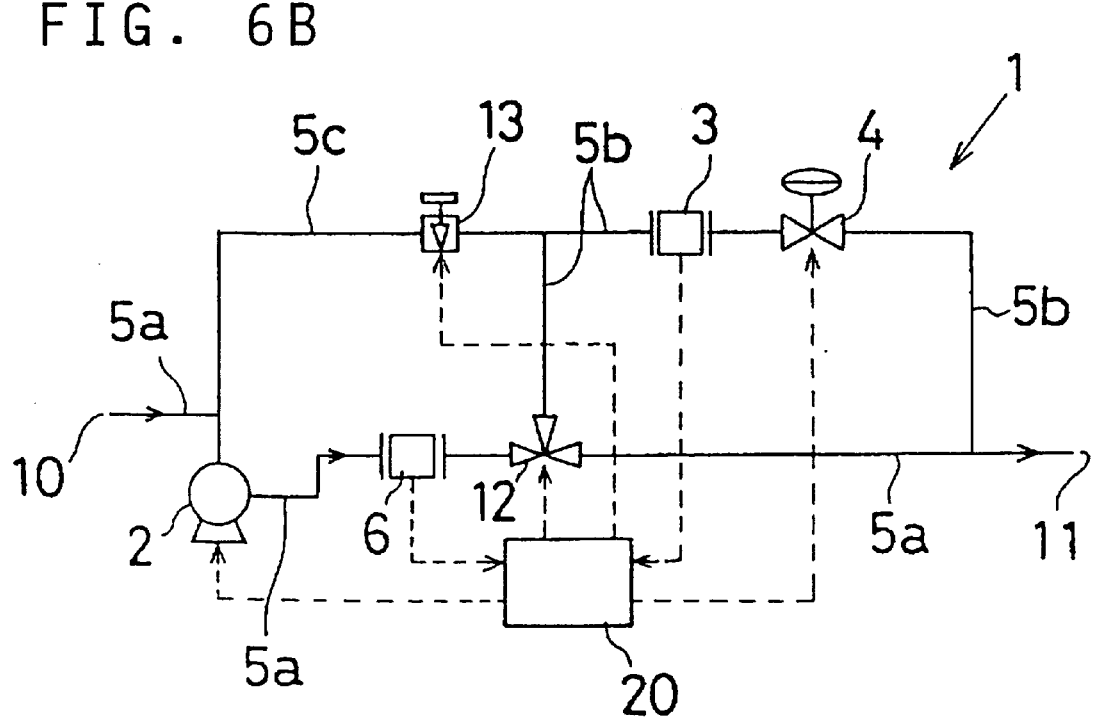

In the flow control device used in Example 1, a flow control device (shown in FIG. 6B) having neither of the bypass back pressure regulating valve 8d and the main line back pressure regulating valve 8a was used to determine the maximum value of the actual flow rate fluctuation rate in the same manner as in Example 1. The results are shown in Table 3.

As will be apparent from Table 1, according to the flow control device of Example 1 of this invention, the maximum fluctuation rate was approximately within ±0.38% over a wide flow rate range of 0.2–20 L/min. It is thus possible to feed a dye concentrate while controlling the flow rate with extremely high accuracy over a wide flow rate range. In the flow rate range of 0.5–20 L/min, particularly high-accuracy flow rate control was possible. That is, the maximum fluctuation rate was within 0.19%.

In contrast, with the flow control device of Comparative Example 1, which is outside the scope of this invention, the maximum fluctuation rate was extremely high when the flow rate was low, i.e. 0.2–2 L/min. The accuracy of flow rate control was thus low. Thus, it was impossible to feed a dye concentrate while controlling the flow rate with high accuracy over a wide flow rate range, i.e. 0.2–20 L/min.

With the flow control device of Comparative Example 2, when compared with Comparative Example 1, the accuracy of flow rate control at a low flow rate (0.2–2 L/min) has improved considerably (maximum fluctuation rate was substantially within ±0.5%). But still, the accuracy of flow rate control at a low flow rate was insufficient compared with the accuracy of flow rate at a high flow rate.

According to the present invention, it is possible to feed fluid at a high flow rate while controlling the flow rate with high accuracy by using only the main pipe line as a flow path and adjusting only the degree of opening of the pump. It is also possible to feed fluid at a low flow rate far lower than the lower limit of the discharge flow rate range of the pump by throttling the fluid fed at a low flow rate by the pump by adjusting the degree of opening of the flow control valve. Also, since pressure fluctuation on the discharge side of the flow control valve can be suppressed by the back pressure regulating valve, it is possible to further improve the accuracy of flow rate control. Thus, it is possible to variably control the flow rate with high accuracy over a wide flow rate range from a high to a low flow rate with a single pump, without the need to use a plurality of pumps. This reduces the cost and the installation space.

If an automatic system for preparing a dye solution is constructed using the flow control device of this invention, the dye solution preparation step in the dyeing of textile products such as continuous dyeing can be carried out automatically, i.e. unmanned. Further, it is possible to improve production efficiency and the quality of production step control, and save energy. This permits a shift from a conventional labor-intensive structure to an online chemical plant type structure. This is a major technical breakthrough.

The concept of this invention is used not only in the field of dyeing of textile products, but also in continuous mixing or continuous coloring steps in paper-making, paint, printing, food, cosmetic and chemical industries, and will make it possible to automate these steps, improve efficiency and the quality of production step control, and save energy.

TABLE 1

| | | preset flow rate | maximum fluctuation rate (%) | |
|---|---|---|---|---|
| | line | (L/min) | + | − |
| Example 1 | main line only | 20.0 | 0.04 | 0.03 |
| | | 15.0 | 0.06 | 0.04 |
| | | 10.0 | 0.05 | 0.07 |
| | | 5.0 | 0.13 | 0.10 |
| | through bypass line | 2.0 | 0.19 | 0.17 |
| | | 1.5 | 0.09 | 0.07 |
| | | 1.0 | 0.12 | 0.14 |
| | | 0.5 | 0.18 | 0.17 |
| | | 0.2 | 0.38 | 0.36 |

TABLE 2

| | | preset flow rate | maximum fluctuation rate (%) | |
|---|---|---|---|---|
| | | (L/min) | + | − |
| Comparative Example 1 | main line only/ pump only | 20.0 | 0.12 | 0.10 |
| | | 15.0 | 0.10 | 0.13 |
| | | 10.0 | 0.13 | 0.12 |
| | | 5.0 | 0.23 | 0.23 |
| | | 2.0 | 0.74 | 0.75 |
| | | 1.5 | 0.98 | 0.96 |
| | | 1.0 | 1.25 | 1.25 |
| | | 0.5 | 1.53 | 1.59 |
| | | 0.2 | 2.05 | 2.09 |

TABLE 3

| | | preset flow rate | maximum fluctuation rate (%) | |
|---|---|---|---|---|
| | line | (L/min) | + | − |
| Comparative Example 2 | main line only | 20.0 | 0.10 | 0.09 |
| | | 15.0 | 0.09 | 0.11 |
| | | 10.0 | 0.12 | 0.10 |
| | | 5.0 | 0.21 | 0.20 |
| | through bypass line | 2.0 | 0.41 | 0.41 |
| | | 1.5 | 0.39 | 0.40 |
| | | 1.0 | 0.43 | 0.41 |
| | | 0.5 | 0.42 | 0.40 |
| | | 0.2 | 0.51 | 0.48 |

What is claimed is:

1. A flow control device comprising:
   a main pipe line having an inlet port through which fluid is introduced into said main pipe line, and a discharge port;
   a pump provided in said main pipe line and having a predetermined discharge flow rate range;
   a flowmeter provided in said main pipe line between said pump and said discharge port;

a flow control valve provided in said main pipe line between said pump and said discharge port; and a return pipe line connecting a point between said flowmeter and said flow control valve with a portion of said main pipe line between said inlet port and said pump;

said flow control valve having a control flow rate range including a flow rate range lower than said predetermined discharge flow rate range of said pump;

whereby the degree of opening of said flow control valve is adjusted based on flow rate data from said flowmeter.

2. A flow control device comprising:

a main pipe line having an inlet port through which fluid is introduced into said main pipe line, and a discharge port;

a bypass pipe line branching from said main pipe line at a first point and merging with said main pipe line at a second point disposed between said first point and said discharge port;

a pump provided in said main pipe line between said inlet port and said first point and having a predetermined discharge flow rate range;

a changeover valve provided in said main pipe line at said first point;

a first flowmeter provided in said main pipe line between said pump and said discharge port;

a second flowmeter and a flow control valve provided in said bypass line;

said flow control valve having a control flow rate range including a flow rate range lower than said predetermined discharge flow rate range of said pump; and a flow control unit for operating said changeover valve to feed fluid into said bypass line and adjusting the degree of opening of said flow control valve based on flow rate data from said second flowmeter if the fluid is to be fed at a flow rate lower than a predetermined value; and for operating said changeover valve to feed fluid through said main pipe line and adjusting the degree of opening of said pump based on flow rate data from said first flowmeter if the fluid is to be fed at a flow rate higher than said predetermined value.

3. A flow control device as claimed in claim 2 further comprising a back pressure regulating valve provided in said bypass line between said flow control valve and said second point for suppressing pressure fluctuation on the discharge side of said flow control valve.

4. A flow control device as claimed in claim 3 further comprising a second back pressure regulating valve provided in said main pipe line between said first and second points for suppressing pressure fluctuation on the discharge side of said pump.

5. A flow control device as claimed in claim 2 further comprising a return pipe line connecting a point of said bypass line downstream of said first point and upstream of said second flowmeter and said flow control valve with the portion of said main pipe line between said inlet port and said pump.

6. A flow control device as claimed in claim 3 further comprising a return pipe line connecting a point of said bypass line downstream of said first point and upstream of said second flowmeter and said flow control valve with the portion of said main pipe line between said inlet port and said pump.

7. A flow control device as claimed in claim 4 further comprising a return pipe line connecting a point of said bypass line downstream of said first point and upstream of said second flowmeter and said flow control valve with the portion of said main pipe line between said inlet port and said pump.

* * * * *